US012683721B2

(12) United States Patent
Dimou et al.

(10) Patent No.: US 12,683,721 B2
(45) Date of Patent: Jul. 14, 2026

(54) OUT OF ORDER HYBRID AUTOMATIC REPEAT REQUEST (HARQ) TRANSMISSION IN PRESENCE OF DEFERRED SEMI-PERSISTENTLY SCHEDULED (SPS) PHYSICAL UPLINK CONTROL CHANNEL (PUCCH) HARQ

(71) Applicant: QUALCOMM Incorporated, San Diego, CA (US)

(72) Inventors: Konstantinos Dimou, New York City, NY (US); Tao Luo, San Diego, CA (US); Yi Huang, San Diego, CA (US); Peter Gaal, San Diego, CA (US); Seyedkianoush Hosseini, San Diego, CA (US); Yan Zhou, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 17/659,323

(22) Filed: Apr. 14, 2022

(65) Prior Publication Data

US 2022/0337356 A1 Oct. 20, 2022

Related U.S. Application Data

(60) Provisional application No. 63/175,512, filed on Apr. 15, 2021.

(51) Int. Cl.
*H04W 72/52* (2023.01)
*H04L 1/1829* (2023.01)
*H04W 72/23* (2023.01)

(52) U.S. Cl.
CPC .......... *H04L 1/1854* (2013.01); *H04L 1/1861* (2013.01); *H04W 72/52* (2023.01); *H04W 72/23* (2023.01)

(58) Field of Classification Search
CPC ... H04L 1/1854; H04L 1/1861; H04L 5/0094; H04L 1/1822; H04L 5/0055; H04W 72/52; H04W 72/23; H04W 72/21
See application file for complete search history.

(56) References Cited

U.S. PATENT DOCUMENTS

| | | | |
|---|---|---|---|
| 10,764,920 | B2 | 9/2020 | Yerramalli et al. |
| 11,277,844 | B2 | 3/2022 | Fakoorian et al. |
| (Continued) | | | |

FOREIGN PATENT DOCUMENTS

| | | | | |
|---|---|---|---|---|
| WO | WO-2020022850 A1 | * | 1/2020 | .......... H04L 1/1628 |
| WO | WO-2021203417 A1 | * | 10/2021 | .......... H04L 1/1812 |
| WO | WO-2022091561 A1 | * | 5/2022 | |

OTHER PUBLICATIONS

LG Electronics: "Discussion on UE feedback enhancement for HARQ-ACK": 3GPP TSG RAN WG1 #104-e: R1-2100880: e-Meeting, Jan. 25-Feb. 5, 2021 (Year: 2021).*

(Continued)

*Primary Examiner* — Sujoy K Kundu
*Assistant Examiner* — Samuel Dilan Rutnam
(74) *Attorney, Agent, or Firm* — Patterson & Sheridan LLP

(57) ABSTRACT

Certain aspects of the present disclosure provide a method for wireless communications by a user equipment (UE). The UE determines that a scheduled occasion for reporting hybrid automatic repeat request (HARQ) feedback for a first semi-persistently scheduled (SPS) physical downlink shared channel (PDSCH) of a first HARQ process identifier (ID) overlaps with at least one downlink or flexible symbol. The UE reports, defers, or drops the HARQ feedback for the first SPS PDSCH if resources for reporting the HARQ feedback for the first SPS PDSCH are not available until on or after a scheduled occasion for reporting a HARQ feedback for a (Continued)

second PDSCH of the same first HARQ process ID, in response to the determining.

18 Claims, 15 Drawing Sheets

(56)                References Cited

U.S. PATENT DOCUMENTS

| 11,742,996 | B2 * | 8/2023 | Bae | H04L 5/0055 |
| | | | | 370/329 |
| 2022/0007399 | A1 * | 1/2022 | Rastegardoost | H04L 5/0073 |
| 2023/0129141 | A1 * | 4/2023 | Babaei | H04L 1/1678 |
| | | | | 370/336 |
| 2023/0361938 | A1 * | 11/2023 | He | H04L 1/1896 |

OTHER PUBLICATIONS

China Telecom: "Discussion on UE Feedback Enhancements for HARQ-ACK", 3GPP TSG RAN WG1 #104b, R1-2102867, 3GPP, Mobile Competence Centre, 650, Route Des Lucioles, F-06921 Sophia-Antipolis Cedex, France, vol. RAN WG1, No. e-Meeting, Apr. 12, 2021-Apr. 20, 2021, 10 pPages, Apr. 6, 2021, XP052058898, the whole document.
International Search Report and Written Opinion—PCT/US2022/071739—ISA/EPO—Jul. 14, 2022.
LG Electronics: "Discussion on UE Feedback Enhancement for HARQ-ACK", 3GPP TSG RAN WG1 #104-e, R1-2100880, 3GPP, Mobile Competence Centre, 650, Route Des Lucioles, F-06921 Sophia-Antipolis Cedex, France, vol. RAN WG1, No. e-Meeting, Jan. 25, 2021-Feb. 5, 2021, 7 Pages, Jan. 19, 2021, XP051971232, URL: https://ftp.3gpp.org/tsg_ran/WG1_RL1/TSGR1_104-e/Docs/R1-2100880.zip R1-2100880 URLLC UE feedback enhancement. docx.
Huawei., et al, "UE Feedback Enhancements for HARQ-ACK", R1-2007565, 3GPP TSG RAN WG1 Meeting #103-e E-meeting, Oct. 26-Nov. 13, 2020, 8 Pages.
LG Electronics: "Discussion on UE Feedback Enhancement for HARQ-ACK", 3GPP TSG RAN WG1 #103-e, R1-2008057, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, XP051946559, 5 Pages.
Samsung: "On HARQ-ACK Reporting Enhancements", R1-2101201, 3GPP TSG RAN WG1 #104-e e-Meeting, Jan. 25-Feb. 5, 2021, pp. 1-8.

* cited by examiner

300

Figure 10:
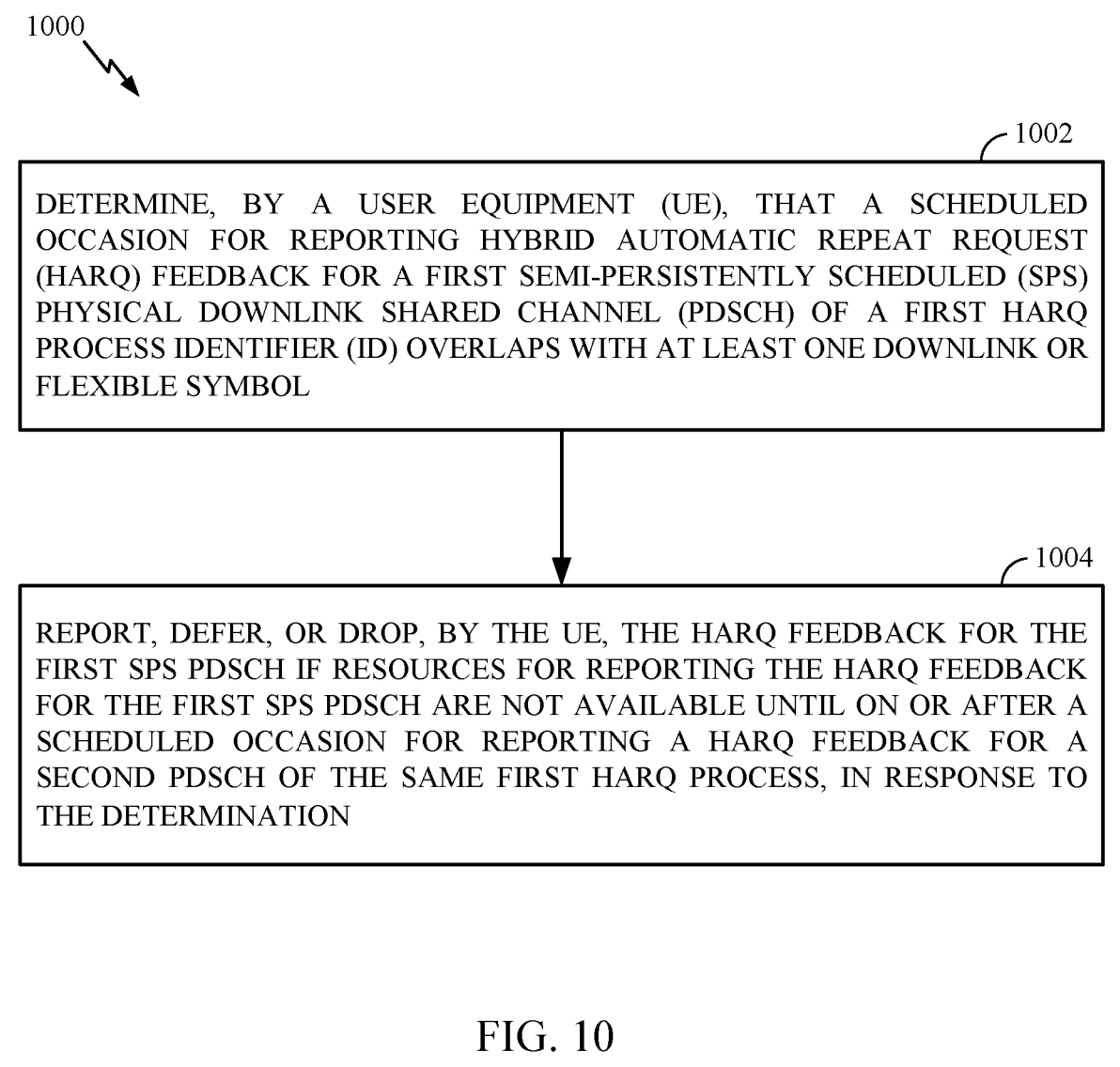

1000

1002

DETERMINE, BY A USER EQUIPMENT (UE), THAT A SCHEDULED OCCASION FOR REPORTING HYBRID AUTOMATIC REPEAT REQUEST (HARQ) FEEDBACK FOR A FIRST SEMI-PERSISTENTLY SCHEDULED (SPS) PHYSICAL DOWNLINK SHARED CHANNEL (PDSCH) OF A FIRST HARQ PROCESS IDENTIFIER (ID) OVERLAPS WITH AT LEAST ONE DOWNLINK OR FLEXIBLE SYMBOL

1004

REPORT, DEFER, OR DROP, BY THE UE, THE HARQ FEEDBACK FOR THE FIRST SPS PDSCH IF RESOURCES FOR REPORTING THE HARQ FEEDBACK FOR THE FIRST SPS PDSCH ARE NOT AVAILABLE UNTIL ON OR AFTER A SCHEDULED OCCASION FOR REPORTING A HARQ FEEDBACK FOR A SECOND PDSCH OF THE SAME FIRST HARQ PROCESS, IN RESPONSE TO THE DETERMINATION

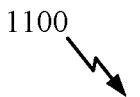

1102

TRANSMIT, BY A NETWORK ENTITY, A FIRST SEMI-PERSISTENTLY SCHEDULED (SPS) PHYSICAL DOWNLINK SHARED CHANNEL (PDSCH) OF A FIRST HYBRID AUTOMATIC REPEAT REQUEST (HARQ) PROCESS IDENTIFIER (ID) TO A USER EQUIPMENT (UE)

1104

TRANSMIT, BY THE NETWORK ENTITY, A SECOND PDSCH OF THE SAME FIRST HARQ PROCESS ID TO THE UE BEFORE RECEIVING A HARQ FEEDBACK FROM THE UE FOR THE FIRST SPS PDSCH

1106

RECEIVIE, BY THE NETWORK ENTITY, THE HARQ FEEDBACK FOR THE FIRST HARQ PROCESS ID ON OR AFTER A SCHEDULED OCCASION FOR REPORTING THE HARQ FEEDBACK FOR THE SECOND PDSCH

1108

DECIDE, BY THE NETWORK ENTITY, WHETHER THE RECEIVED HARQ FEEDBACK IS FOR THE FIRST SPS PDSCH OR THE SECOND PDSCH

Processing System    1304

1312

Processor

1318

Circuitry for determining that a scheduled occasion for reporting hybrid automatic repeat request (HARQ) feedback for a first semi-persistently scheduled (SPS) physical downlink shared channel (PDSCH) of a first HARQ process identifier (ID) overlaps with at least one downlink or flexible symb

1320

Circuitry for reporting, deferring, or dropping the HARQ feedback for the first SPS PDSCH if resources for reporting the HARQ feedback for the first SPS PDSCH are not available until on or after a scheduled occasion for reporting a HARQ feedback for a second PDSCH of the same first HARQ process ID, in response to the determining Computer-Readable Medium/Memory

1314

Code for determining that a scheduled occasion for reporting hybrid automatic repeat request (HARQ) feedback for a first semi-persistently scheduled (SPS) physical downlink shared channel (PDSCH) of a first HARQ process identifier (ID) overlaps with at least one downlink or flexible symb

1316

Code for reporting, deferring, or dropping the HARQ feedback for the first SPS PDSCH if resources for reporting the HARQ feedback for the first SPS PDSCH are not available until on or after a scheduled occasion for reporting a HARQ feedback for a second PDSCH of the same first HARQ process ID, in response to the determining

1310

1308

Transceiver

1306

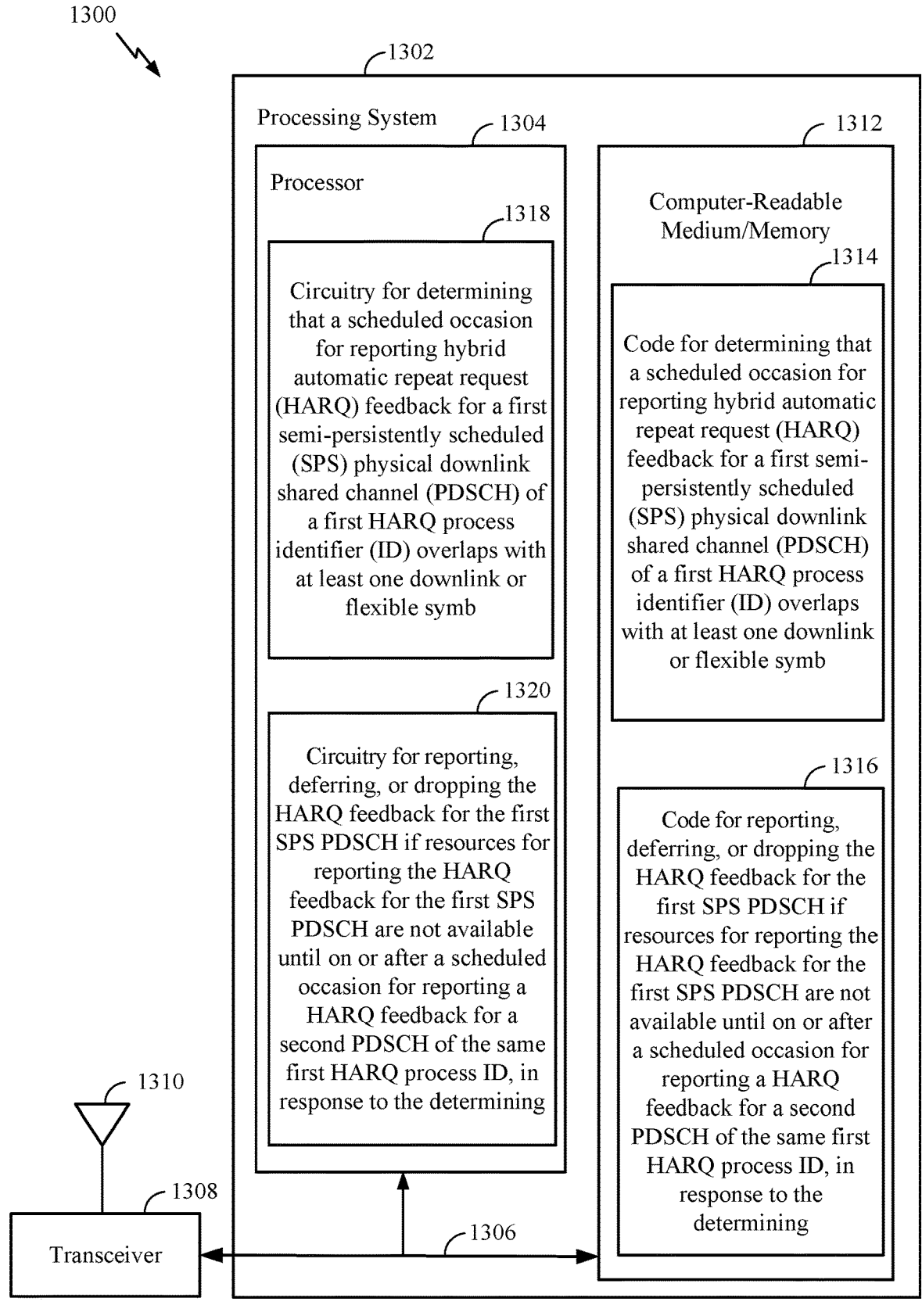

FIG. 13

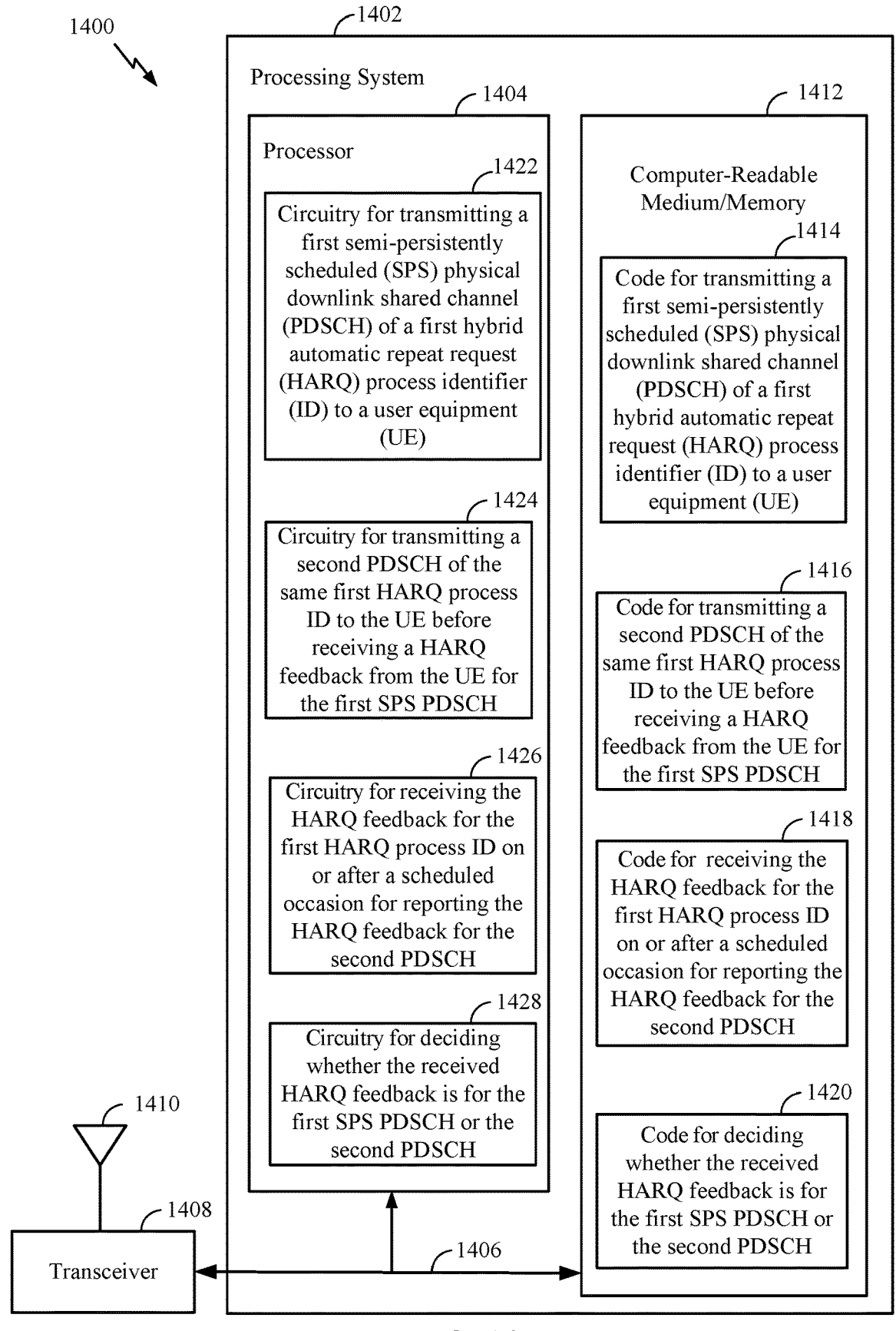

1400

1402

Processing System

1404

Processor

1422

Circuitry for transmitting a first semi-persistently scheduled (SPS) physical downlink shared channel (PDSCH) of a first hybrid automatic repeat request (HARQ) process identifier (ID) to a user equipment (UE)

1424

Circuitry for transmitting a second PDSCH of the same first HARQ process ID to the UE before receiving a HARQ feedback from the UE for the first SPS PDSCH

1426

Circuitry for receiving the HARQ feedback for the first HARQ process ID on or after a scheduled occasion for reporting the HARQ feedback for the second PDSCH

1428

Circuitry for deciding whether the received HARQ feedback is for the first SPS PDSCH or the second PDSCH

1412

Computer-Readable Medium/Memory

1414

Code for transmitting a first semi-persistently scheduled (SPS) physical downlink shared channel (PDSCH) of a first hybrid automatic repeat request (HARQ) process identifier (ID) to a user equipment (UE)

1416

Code for transmitting a second PDSCH of the same first HARQ process ID to the UE before receiving a HARQ feedback from the UE for the first SPS PDSCH

1418

Code for receiving the HARQ feedback for the first HARQ process ID on or after a scheduled occasion for reporting the HARQ feedback for the second PDSCH

1420

Code for deciding whether the received HARQ feedback is for the first SPS PDSCH or the second PDSCH

1410

1408

Transceiver

OUT OF ORDER HYBRID AUTOMATIC REPEAT REQUEST (HARQ) TRANSMISSION IN PRESENCE OF DEFERRED SEMI-PERSISTENTLY SCHEDULED (SPS) PHYSICAL UPLINK CONTROL CHANNEL (PUCCH) HARQ

CROSS-REFERENCE TO RELATED APPLICATION

This application claims benefit of and priority to U.S. Provisional Application No. 63/175,512, filed Apr. 15, 2021, which is hereby incorporated by reference in its entirety.

TECHNICAL FIELD

Aspects of the present disclosure relate to wireless communications, and more particularly, to techniques for managing hybrid automatic repeat request (HARQ) transmissions.

INTRODUCTION

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communications system may include a number of base stations, each simultaneously supporting communications for multiple communications devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communications system may include a number of distributed units (DUs) (e.g., edge units (EUs), edge nodes (ENs), radio heads (RHs), smart radio heads (SRHs), transmission reception points (TRPs), etc.) in communications with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

Aspects of the present disclosure relate to wireless communications, and more particularly, to techniques for managing an out of order hybrid automatic repeat request (HARQ) transmission in presence of a deferred semi-persistently scheduled (SPS) physical uplink control channel (PUCCH) HARQ.

Certain aspects of the present disclosure provide a method for wireless communications by a user equipment (UE). The method generally includes determining that a scheduled occasion for reporting hybrid automatic repeat request (HARQ) feedback for a first semi-persistently scheduled (SPS) physical downlink shared channel (PDSCH) of a first HARQ process identifier (ID) overlaps with at least one downlink or flexible symbol; and reporting, deferring, or dropping the HARQ feedback for the first SPS PDSCH if resources for reporting the HARQ feedback for the first SPS PDSCH are not available until on or after a scheduled occasion for reporting a HARQ feedback for a second PDSCH of the same first HARQ process ID, in response to the determining.

Certain aspects of the present disclosure provide a method for wireless communications by a network entity. The method generally includes transmitting a first SPS physical downlink shared channel (PDSCH) of a first HARQ process ID to a UE; transmitting a second PDSCH of the same first HARQ process ID to the UE before receiving a HARQ feedback from the UE for the first SPS PDSCH; receiving the HARQ feedback for the first HARQ process ID on or after a scheduled occasion for reporting the HARQ feedback for the second PDSCH; and deciding whether the received HARQ feedback is for the first SPS PDSCH or the second PDSCH.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 10 is a flow diagram of example operations that may be performed by a UE, in accordance with aspects of the present disclosure.

FIG. 11 is a flow diagram of example operations that may be performed by a network entity, in accordance with aspects of the present disclosure.

FIG. 13 illustrates a communications device that may include various components configured to perform operations for the techniques disclosed herein in accordance with aspects of the present disclosure.

FIG. 14 illustrates a communications device that may include various components configured to perform operations for the techniques disclosed herein in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
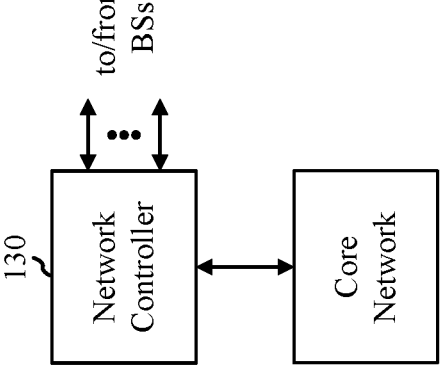
FIG. 1 is a block diagram conceptually illustrating an example wireless communication network, in accordance with certain aspects of the present disclosure.

Aspects of the present disclosure relate to wireless communications, and more particularly, to techniques for managing an out of order hybrid automatic repeat request (HARQ) transmission in case of a deferred semi-persistently scheduled (SPS) physical uplink control channel (PUCCH) HARQ.

In some cases, to handle a collision for a same HARQ process due to a deferred SPS HARQ acknowledgement (HARQ-ACK), one or more techniques for managing an out of order HARQ transmission are implemented. For example, when a user equipment (UE) receives a physical downlink shared channel (PDSCH) of a certain HARQ process identifier (ID), the deferred SPS HARQ bit(s) for this HARQ process ID are dropped based on the one or more techniques described herein. In other words, the deferred HARQ bits (e.g., first HARQ bits) may be initially stored, however, when new HARQ bits (e.g., second HARQ bits) associated with the same HARQ process are available, the first HARQ bits are no longer stored and are dropped. Accordingly, in such cases, the UE does not report the first HARQ bits since the first HARQ bits are dropped. The techniques described herein provide higher reliability and lower latency communications.

Aspects of the present disclosure provide apparatus, methods, processing systems, and computer readable mediums for new radio (NR) (e.g., NR access technology or 5G technology). NR may support various wireless communications services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate using beam-formed transmissions. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communications networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communications systems, such as 5G and later, including NR technologies.

Example Wireless Communication Network

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 illustrates an example wireless communication network 100 in which aspects of the present disclosure may be performed. For example, according to certain aspects, the wireless communication network 100 may include network entities (e.g., base stations (BSs) 110) and/or user equipments (UEs) 120 for managing an out of order hybrid automatic repeat request (HARQ) transmission in case of a deferred semi-persistently scheduled (SPS) physical uplink control channel (PUCCH) HARQ. As shown in FIG. 1, a UE 120a includes a HARQ manager 122 and a BS 110a includes a HARQ manager 112. The HARQ manager 122 is configured to perform operations 1000 of FIG. 10. The HARQ manager 112 is configured to perform operations 1100 of FIG. 11.

As illustrated in FIG. 1, the wireless communication network 100 may include a number of BSs 110 and other network entities. According to one example, the network entities including the BS and UEs may communicate on high frequencies (e.g., >6 GHz) using beams.

A BS 110 may be a station that communicates with UEs. Each BS 110 may provide communications coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS 110 may provide communications coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a Closed Subscriber Group (CSG), UEs

120 for users in the home, etc.). A BS 110 for a macro cell may be referred to as a macro BS. A BS 110 for a pico cell may be referred to as a pico BS. A BS 110 for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BS for the femto cells 102*y* and 102*z*, respectively. A BS 110 may support one or multiple (e.g., three) cells.

The wireless communication network 100 may also include relay stations. A relay station is a station that receives a transmission of data and/or other information from an upstream station (e.g., a BS 110 or a UE 120) and sends a transmission of the data and/or other information to a downstream station (e.g., a UE 120 or a BS 110). A relay station may also be a UE 120 that relays transmissions for other UEs 120. In the example shown in FIG. 1, a relay station 110*r* may communicate with the BS 110*a* and a UE 120*r* to facilitate communications between the BS 110*a* and the UE 120*r*. A relay station may also be referred to as a relay BS, a relay, etc.

The wireless communication network 100 may be a heterogeneous network that includes BSs 110 of different types, e.g., macro BS, pico BS, femto BS, relays, etc. These different types of BSs 110 may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs 110 may have similar frame timing, and transmissions from different BSs 110 may be approximately aligned in time. For asynchronous operation, the BSs 110 may have different frame timing, and transmissions from different BSs 110 may not be aligned in time. The techniques described herein may be used for both synchronous and asynchronous operation.

A network controller 130 may couple to a set of BSs 110 and provide coordination and control for these BSs 110. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless communication network 100, and each UE 120 may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS 110, another device (e.g., remote device), or some other entity. A wireless node may provide, for example, connectivity for or to a network (e.g., a wide area network such as Internet or a cellular network) via a wired or wireless communications link. Some UEs 120 may be considered Internet-of-Things (IoT) devices.

In FIG. 1, a solid line with double arrows indicates desired transmissions between a UE 120 and a serving BS 110, which is a BS 110 designated to serve the UE 120 on the downlink and/or uplink. A dashed line with double arrows indicates interfering transmissions between a UE 120 and a BS 110.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE 120. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS 110)

allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. That is, in some examples, a UE 120 may function as a scheduling entity, scheduling resources for one or more subordinate entities (e.g., one or more other UEs 120). In this example, the UE 120 is functioning as a scheduling entity, and other UEs 120 utilize resources scheduled by the UE 120 for wireless communications. A UE 120 may function as a scheduling entity in a peer-to-peer (P2P) network, and/or in a mesh network. In a mesh network example, UEs 120 may optionally communicate directly with one another in addition to communicating with the scheduling entity.

Thus, in a wireless communications network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs 110. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs 110 may transmit downlink signals to UEs 120 indicating the cell type. Based on the cell type indication, the UE 120 may communicate with the NR BS 110. For example, the UE 120 may determine NR BSs 110 to consider for cell selection, access, handover, and/or measurement based on the indicated cell type.

Figure 15:
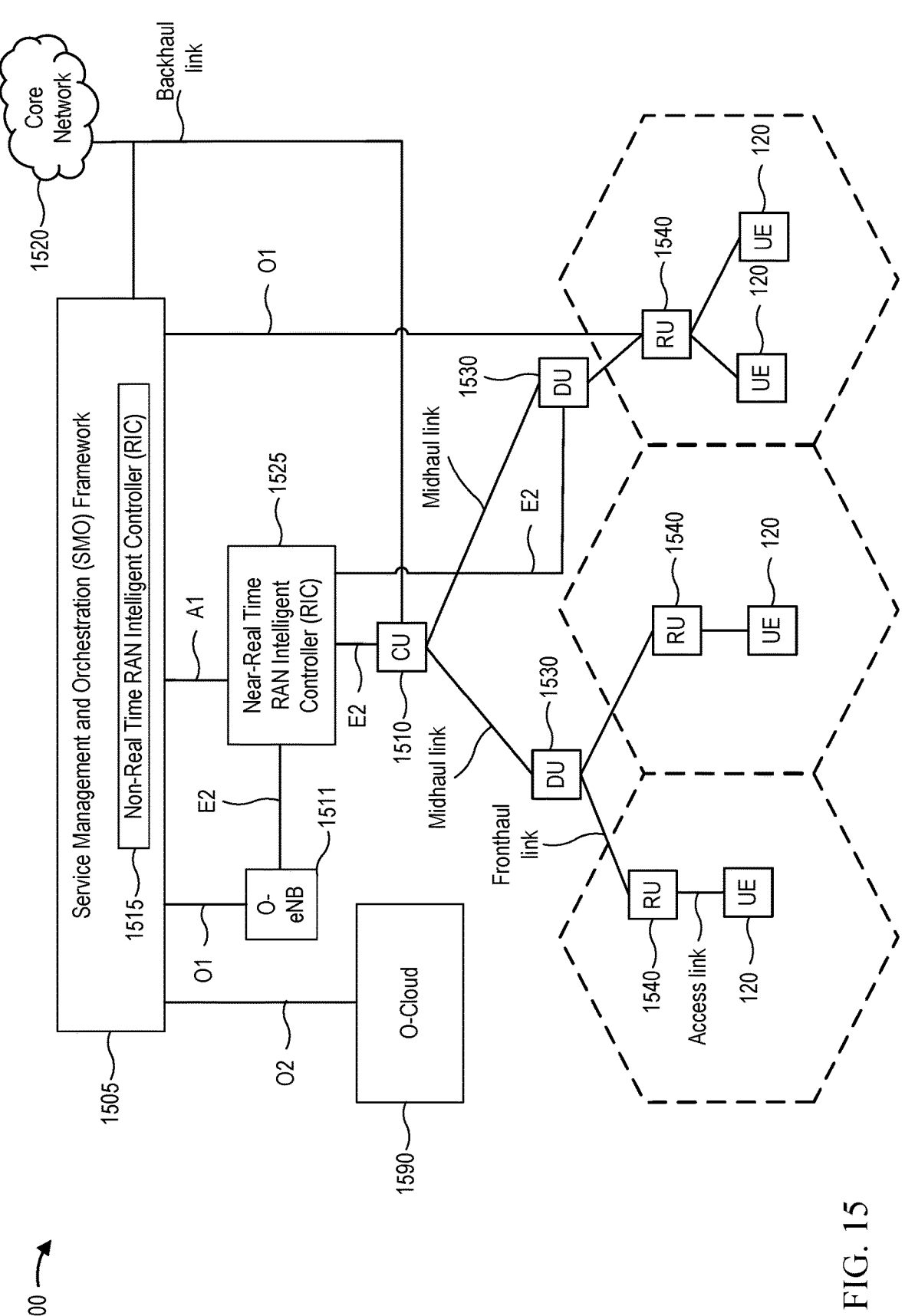
FIG. 15 depicts an example disaggregated BS architecture.

In various aspects, a BS 110 (or a network node) can be implemented as an aggregated BS, a disaggregated BS, an integrated access and backhaul (IAB) node, a relay node, or a sidelink node, to name a few examples. FIG. 15, discussed in further detail later in this disclosure, depicts an example disaggregated BS architecture.

Figure 2:
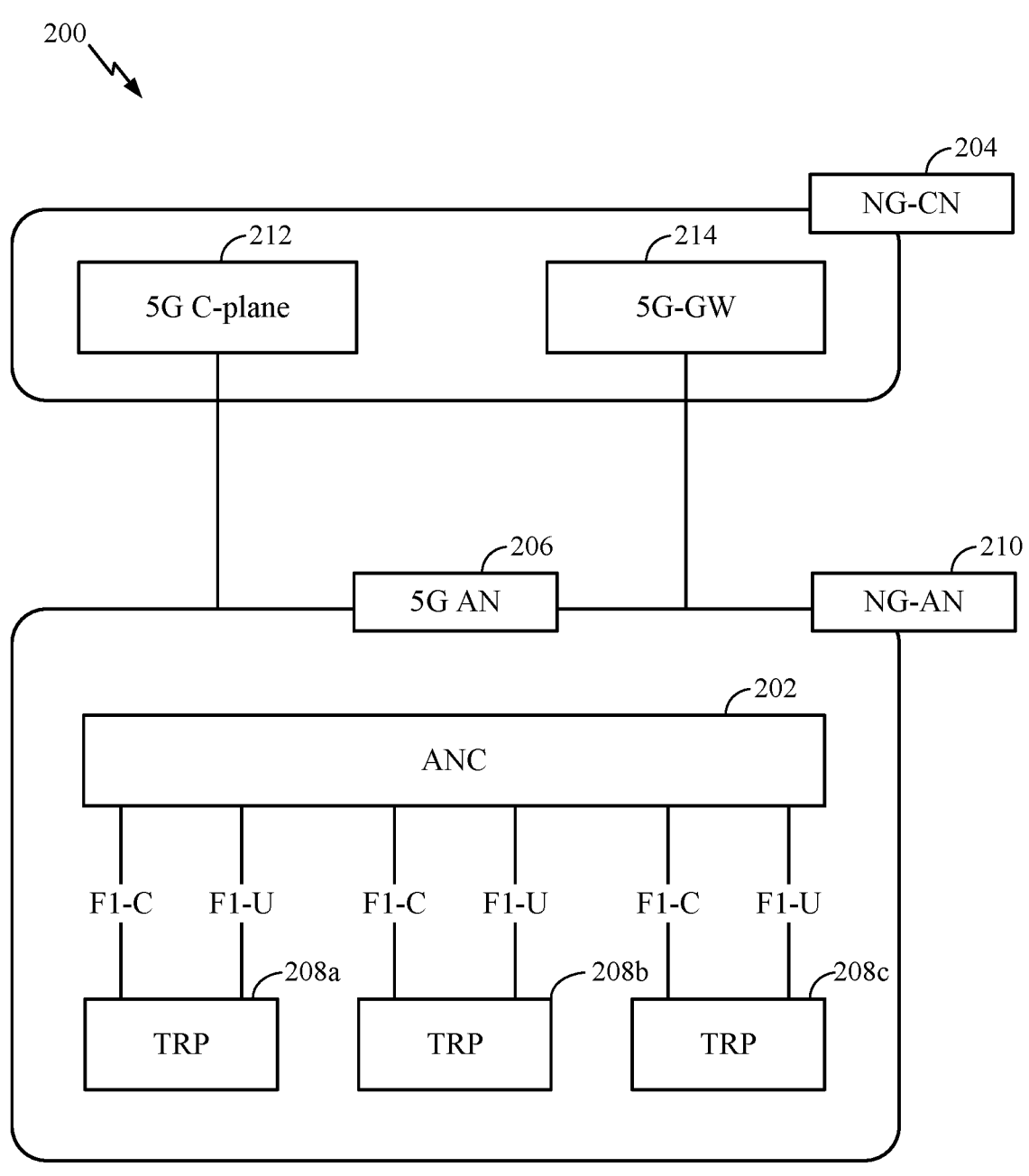
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communications system illustrated in FIG. 1. A 5G access node 206 may include an access node controller (ANC) 202. The ANC may be a central unit (CU) of the distributed RAN 200. The backhaul interface to the next generation core network (NG-CN) 204 (e.g., associated with 5G control plane (5G C-plane) 212 and 5G gateway (5G-GW) 214) may terminate at the ANC. The backhaul interface to neighboring next generation access nodes (NG ANs) may terminate at the ANC. The ANC may include one or more TRPs 208a, 208b, 208c (which may also be referred to as BSs, NR BSs, Node Bs, 5G NBs, APs, or some other term). As described above, a TRP may be used interchangeably with "cell."

The TRPs 208a, 208b, 208c may be a DU. The TRPs 208a, 808b, 208c may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs 208a, 208b, 208c may be configured to individually (e.g., dynamic selection) or jointly (e.g., joint transmission) serve traffic to a UE.

The distributed RAN 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208a, 208b, 208c. For example, cooperation may be preset within a TRP and/or across TRPs 208a, 208b, 208c via the ANC 202. According to aspects, no inter-TRP interface may be needed/present.

According to aspects, a dynamic configuration of split logical functions may be present within the distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
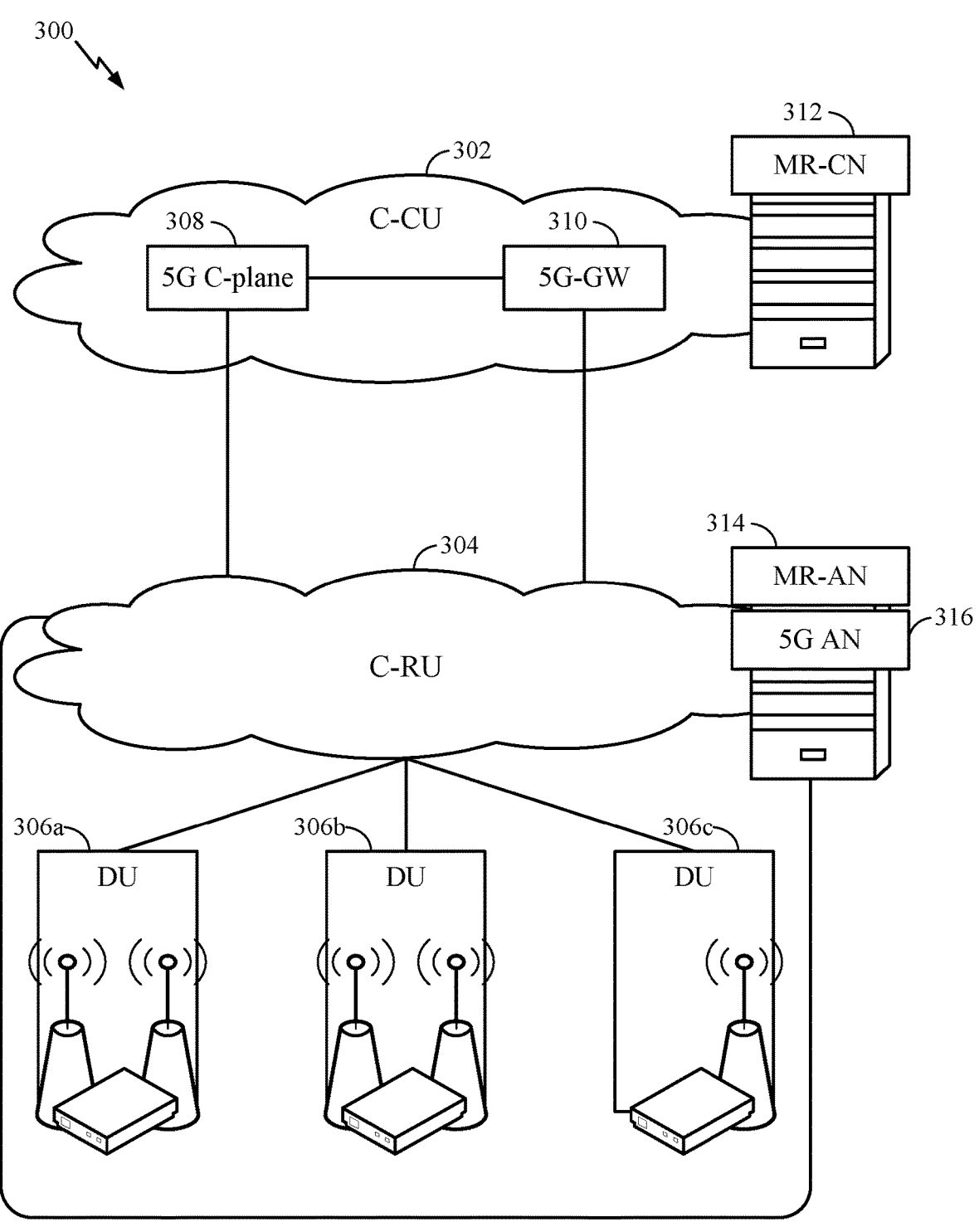
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 (e.g., associated with 5G C-plane 308 and 5G-GW 310 associated with mobile radio (MR) communication network (CN) 312) may host core network functions. The C-CU 302 may be centrally deployed. C-CU functionality may be offloaded (e.g., to advanced wireless services (AWS)), to handle peak capacity.

A centralized RAN unit (C-RU) 304 (e.g., associated with MR access network (AN) 314 and 5G AN 316) may host one or more ANC functions. Optionally, the C-RU 304 may host core network functions locally. The C-RU 304 may have distributed deployment. The C-RU 304 may be closer to the network edge.

A DU 306 (e.g., 306a, 306b, or 306c) may host one or more TRPs (edge node (EN), an edge unit (EU), a radio head (RH), a smart radio head (SRH), or the like). The DU 306 may be located at edges of the network with radio frequency (RF) functionality.

Figure 4:
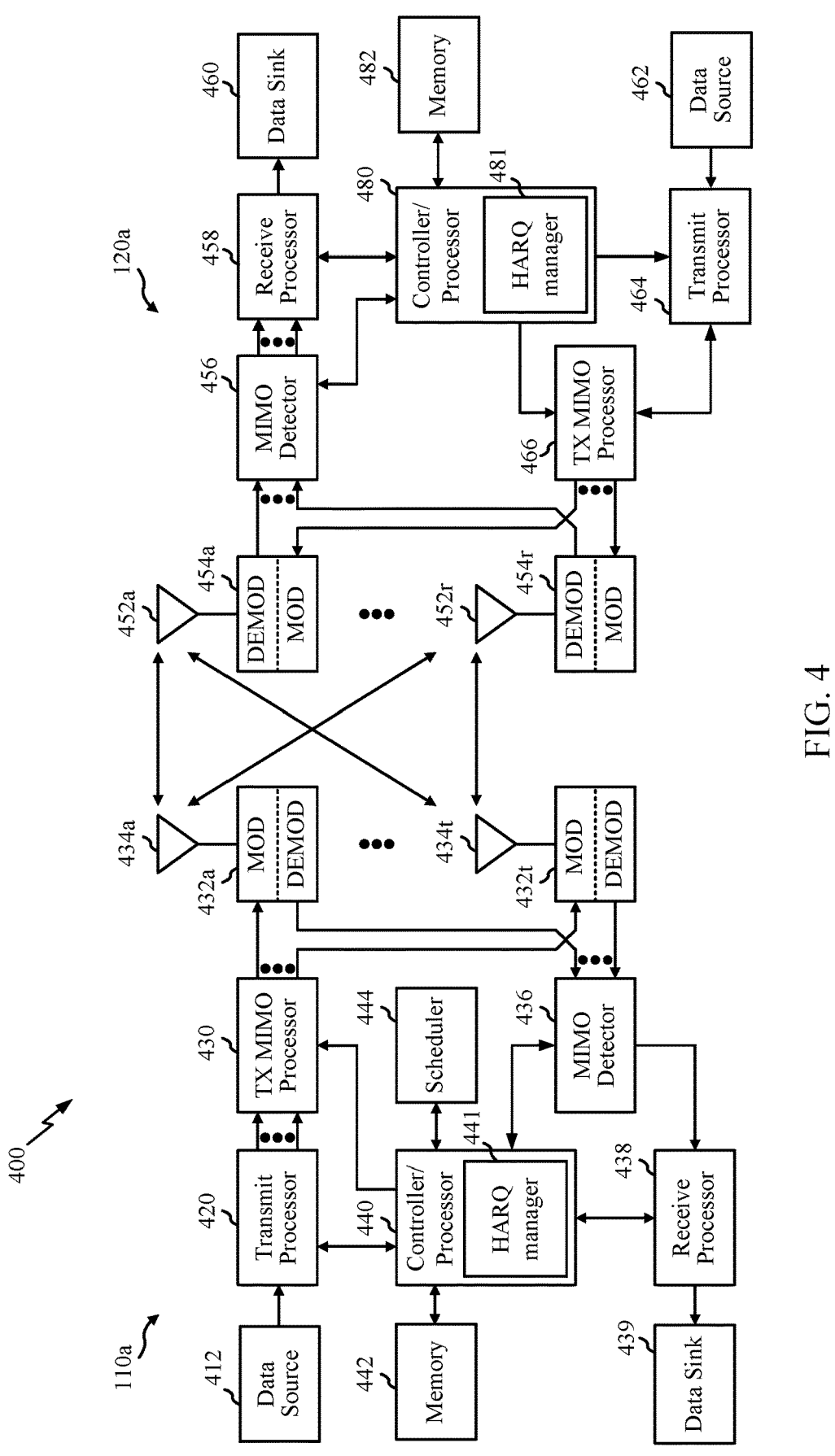
FIG. 4 is a block diagram conceptually illustrating a design of an example base station (BS) and user equipment (UE), in accordance with certain aspects of the present disclosure.

FIG. 4 illustrates example components of a network entity (e.g., a BS 110a) and a UE 120a (e.g., in the wireless communication network 100 of FIG. 1).

At the BS 110a, a transmit processor 420 may receive data from a data source 412 and control information from a controller/processor 440. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 420 may process (e.g., encode and symbol map) the data and control information to obtain data symbols and control symbols, respectively. The transmit processor 420 may also generate reference symbols, such as for a primary synchronization signal (PSS), a secondary synchronization signal (SSS), and a channel state information reference signal (CSI-RS). A transmit multiple-input multiple-output (MIMO) processor 430 may perform spatial processing (e.g., precoding) on the data symbols, the control symbols, and/or the reference symbols, if applicable, and may provide output symbol streams to modulators (MODs) in transceivers 432a-432t. Each MOD in transceivers 432a-432t may process a respective output symbol stream (e.g., for orthogonal frequency division multiplexing (OFDM), etc.) to obtain an output sample stream. Each MOD in transceivers 432a-432t may further process (e.g., convert to analog, amplify, filter, and upconvert) the output sample stream to obtain a downlink (DL) signal. The DL signals from the MODs in transceivers 432a-432t may be transmitted via antennas 434a-434t, respectively.

At the UE 120a, antennas 452a-452r may receive DL signals from the BS 110a and may provide received signals to demodulators (DEMODs) in transceivers 454a-454r, respectively. Each DEMOD in the transceiver 454 may condition (e.g., filter, amplify, downconvert, and digitize) a respective received signal to obtain input samples. Each DEMOD in the transceiver 454 may further process the input samples (e.g., for OFDM, etc.) to obtain received symbols. A MIMO detector 456 may obtain received symbols from all the DEMODs in the transceivers 454a-454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On an uplink (UL), at the UE 120a, a transmit processor 464 may receive and process data (e.g., for a PUSCH) from a data source 462 and control information (e.g., for a physical uplink control channel (PUCCH) from the controller/processor 480. The transmit processor 464 may also generate reference symbols for a reference signal (e.g., for a sounding reference signal (SRS)). The symbols from the transmit processor 464 may be precoded by a transmit MIMO processor 466 if applicable, further processed by the MODs in transceivers 454a-454r (e.g., for SC-FDM, etc.), and transmitted to the BS 110a. At the BS 110a, the UL signals from the UE 120a may be received by the antennas 434, processed by the DEMODs in transceivers 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

Memories 442 and 482 may store data and program codes for the BS 110a and the UE 120a, respectively. A scheduler 444 may schedule the UE 120a for data transmission on a DL and/or an UL.

Antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein. For example, as shown in FIG. 4, the controller/processor 440 of the BS 110a has a HARQ manager 441 that may be configured to perform the operations illustrated in FIG. 11, as well as other operations disclosed herein. As shown in FIG. 4, the controller/processor 480 of the UE 120a has a HARQ manager 481 that may be configured to perform the operations illustrated in FIG. 10, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 5:
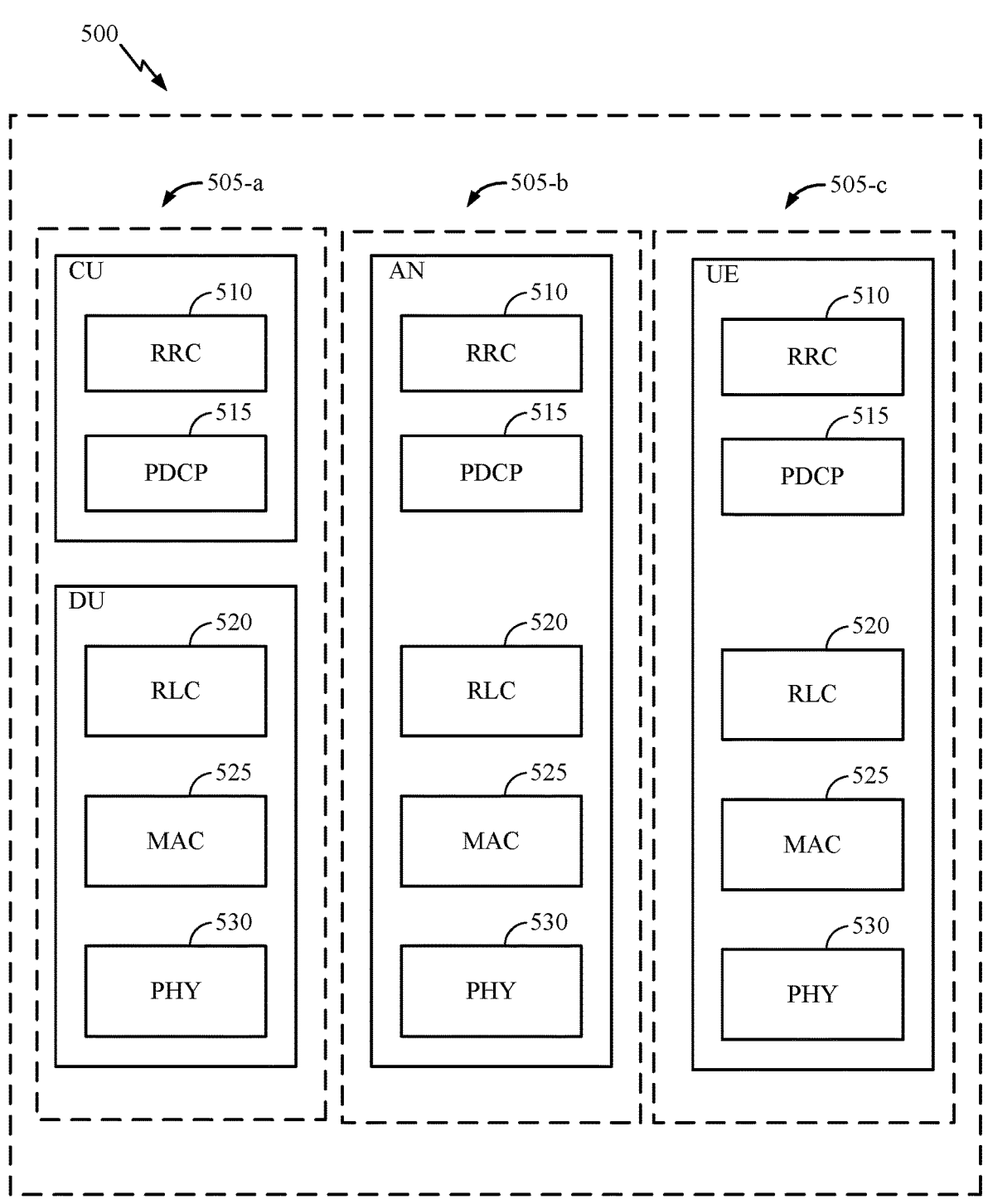
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, at 505c, a UE may implement an entire protocol stack (e.g., the RRC layer 510, the PDCP layer 515, the RLC layer 520, the MAC layer 525, and the PHY layer 530).

Figure 6:
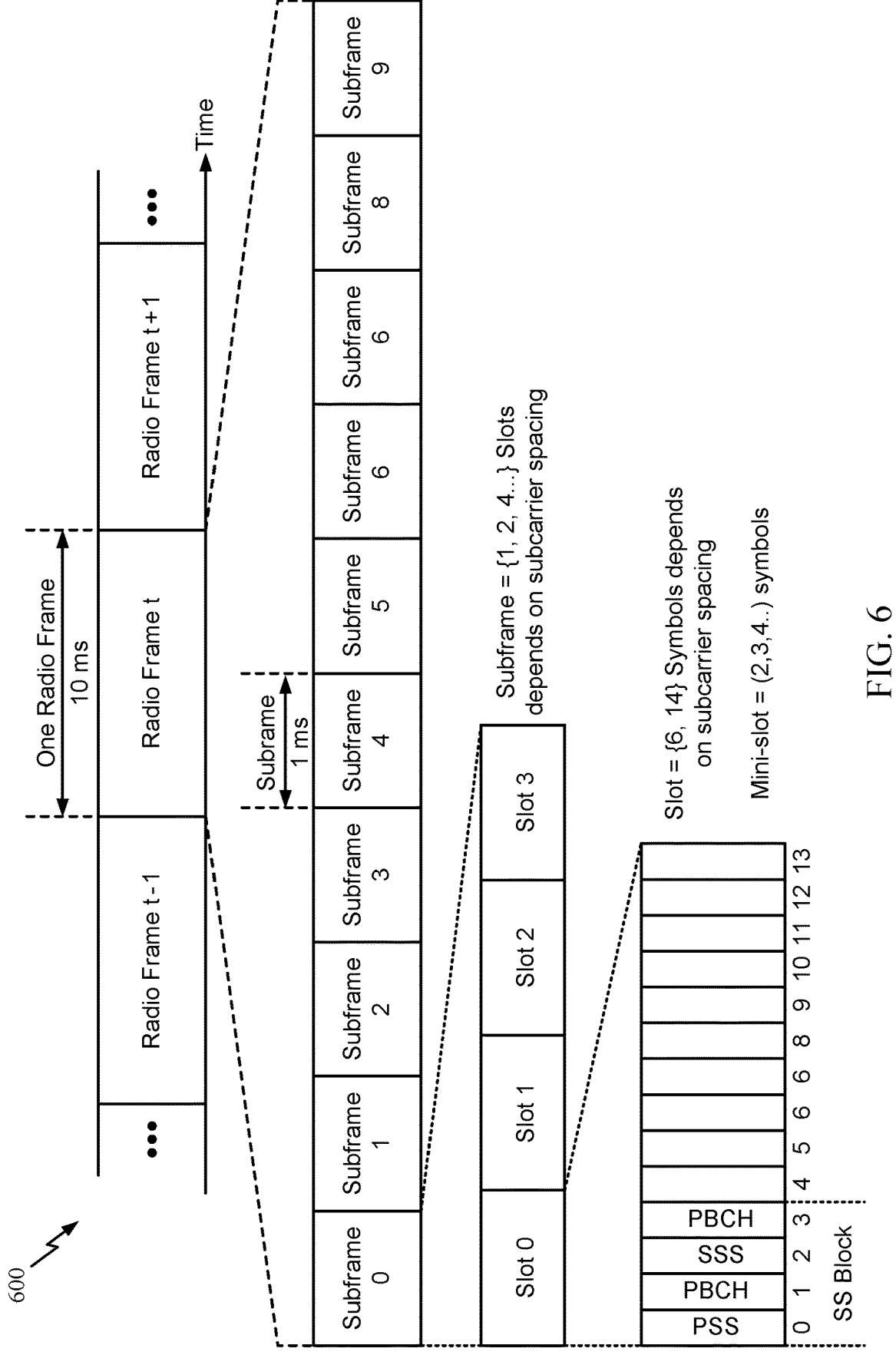
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Semi-Persistent Scheduling (SPS) Physical Downlink Shared Channel (PDSCH) Configuration Semi-persistently scheduled or semi-persistent scheduling (SPS) resource allocation, which is sometimes called configured downlink assignment, refers to a scheduling technique where a user equipment (UE) is pre-configured by a network entity (e.g., eNBs, gNB, etc.) with a periodicity and an offset.

Figure 7:
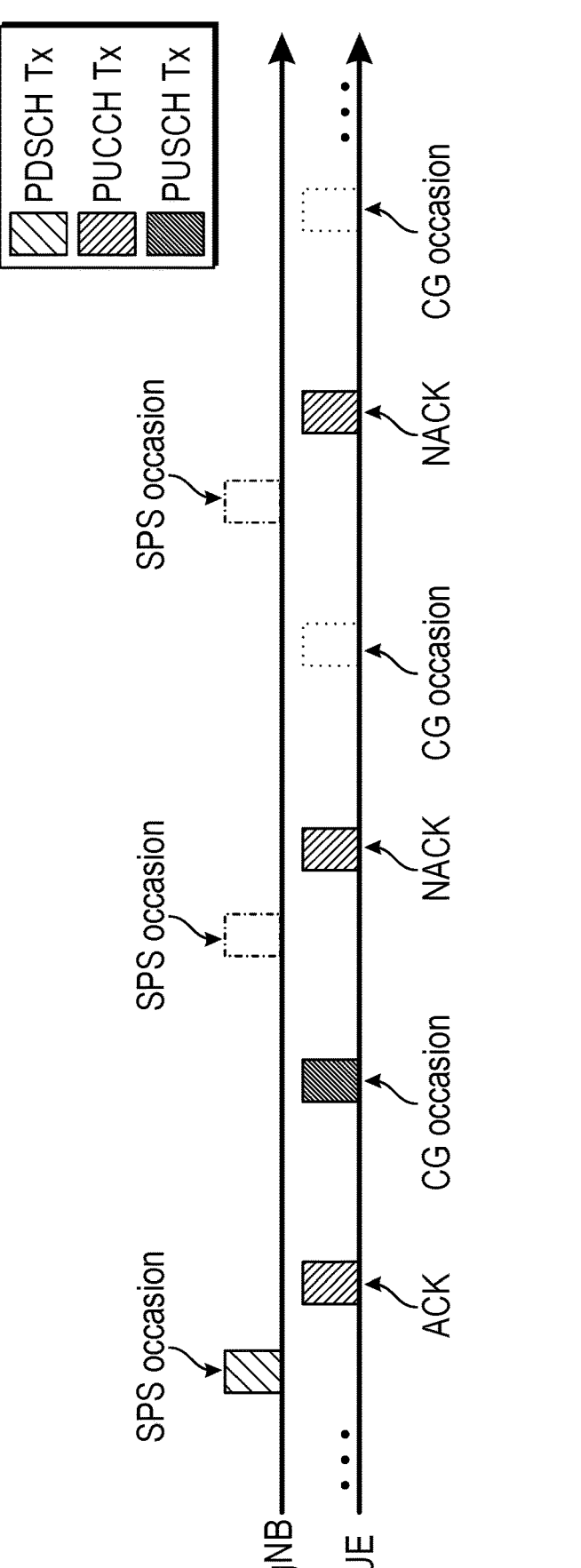
FIG. 7 illustrates an example of semi-persistently scheduled (SPS) physical downlink shared channel (PDSCH) occasions that may be used to activate configured grant (CG) occasions, in accordance with certain aspects of the present disclosure.

As illustrated in FIG. 7, once pre-configured, if the UE were to receive an allocation of downlink resources, then the allocation of SPS occasions would repeat according to the pre-configured periodicity, resulting in periodic SPS occasions. For SPS, the network entity may use radio resource control (RRC) signaling to define the periodicity of configured downlink assignments. Similarly, once configured with configured grant (CG) occasions, the allocation of CG occasions may repeat according to the pre-configured periodicity.

As used herein, the term occasion refers to a time in which resources are allocated for a transmission that may or may not ultimately happen. For example, a downlink transmission may or may not occur in an SPS occasion. Similarly, an uplink (UL) transmission may or may not occur in a CG occasion. Occasions may be considered activated if the transmission may occur and, thus, those occasions should be monitored.

Example Hybrid Automatic Repeat Request (HARQ) Delay for SPS PDSCH

New radio (NR) may provide support for downlink (DL) semi-persistent scheduling (SPS) for periodic traffic. For a time division duplexed (TDD) system (e.g., in Rel-15 and/or Rel-16), if a slot scheduled for reporting hybrid automatic repeat request (HARQ) feedback for the SPS is a DL slot, or overlapping with at least one DL symbol, a user equipment (UE) will not transmit the HARQ feedback. This may result in a waste of system resource(s), since a network entity (e.g., a base station (BS) such as a gNB) may need to retransmit the SPS physical downlink shared channel (PDSCH) again due to missed a HARQ report.

The overlap may be due to various reasons. For example, the DL slot/symbols may be semi-statically configured to be DL, or the slots/symbols may be converted to the DL (or "dynamic flexible") from semi-static "flexible" by a dynamic slot format indicator (SFI) or dynamic DL control information (DCI) (e.g., a DL grant scheduling PDSCH, or a grant scheduling aperiodic channel state information reference signals (CSI-RS) transmission).

In some cases (e.g., in NR Rel-17), the HARQ feedback for SPS PDSCH may be enhanced by delaying the HARQ feedback that conflicts with the DL symbols/slots (or "dynamic flexible" symbols) to later uplink (UL) symbols/slots. For example, if an SPS HARQ-ACK cannot be transmitted in a first slot or subslot of a scheduled physical uplink control channel (PUCCH) occasion due to conflict with the DL symbols/slots, it can be delayed (deferred) to a next (or a later) UL slot/subslot.

Figure 8:
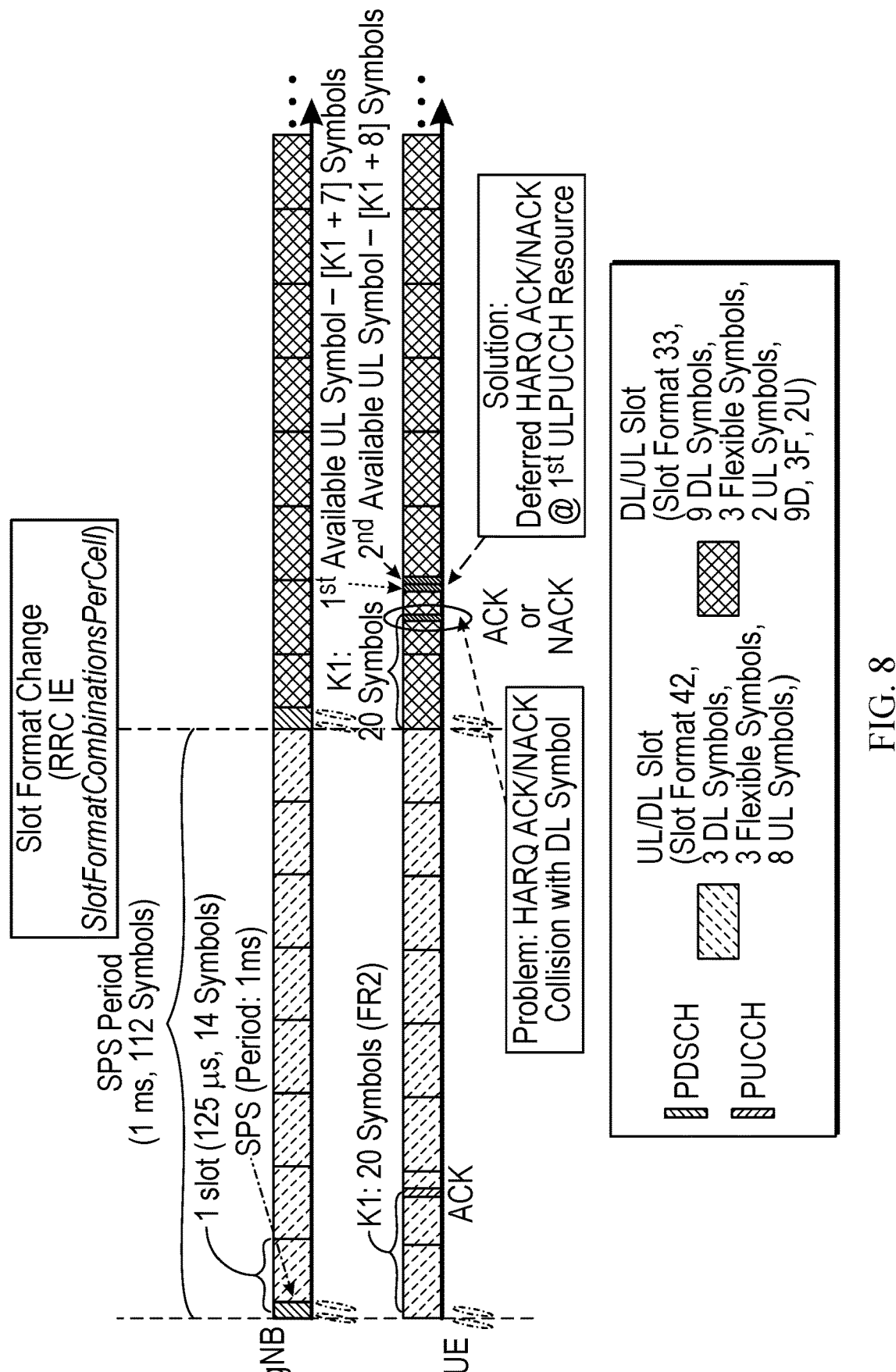
FIG. 8 illustrates an example timeline of deferring hybrid automatic repeat request (HARQ) feedback up to a first available physical uplink control channel (PUCCH) resource, in accordance with certain aspects of the present disclosure.

In some cases, when the slot scheduled for reporting the HARQ feedback for the SPS overlaps/collides with a DL symbol, as illustrated in FIG. 8, the HARQ feedback can be deferred up to a first available/valid PUCCH resource. This may be done using already configured SPS PUCCH resources. In some cases, a change in a slot format may happen according to a pattern defined in an information element (IE) (e.g., such as SlotFormatCombinationsPerCell). Also, SPS PUCCH A/N may indicate a PUCCH Format 0 (1 bit). Thus, a first UL PUCCH resource may correspond to a first available UL symbol. Also, in this case, there may be no multiplexing with other PUCCH transmissions from a same UE.

Figure 9:
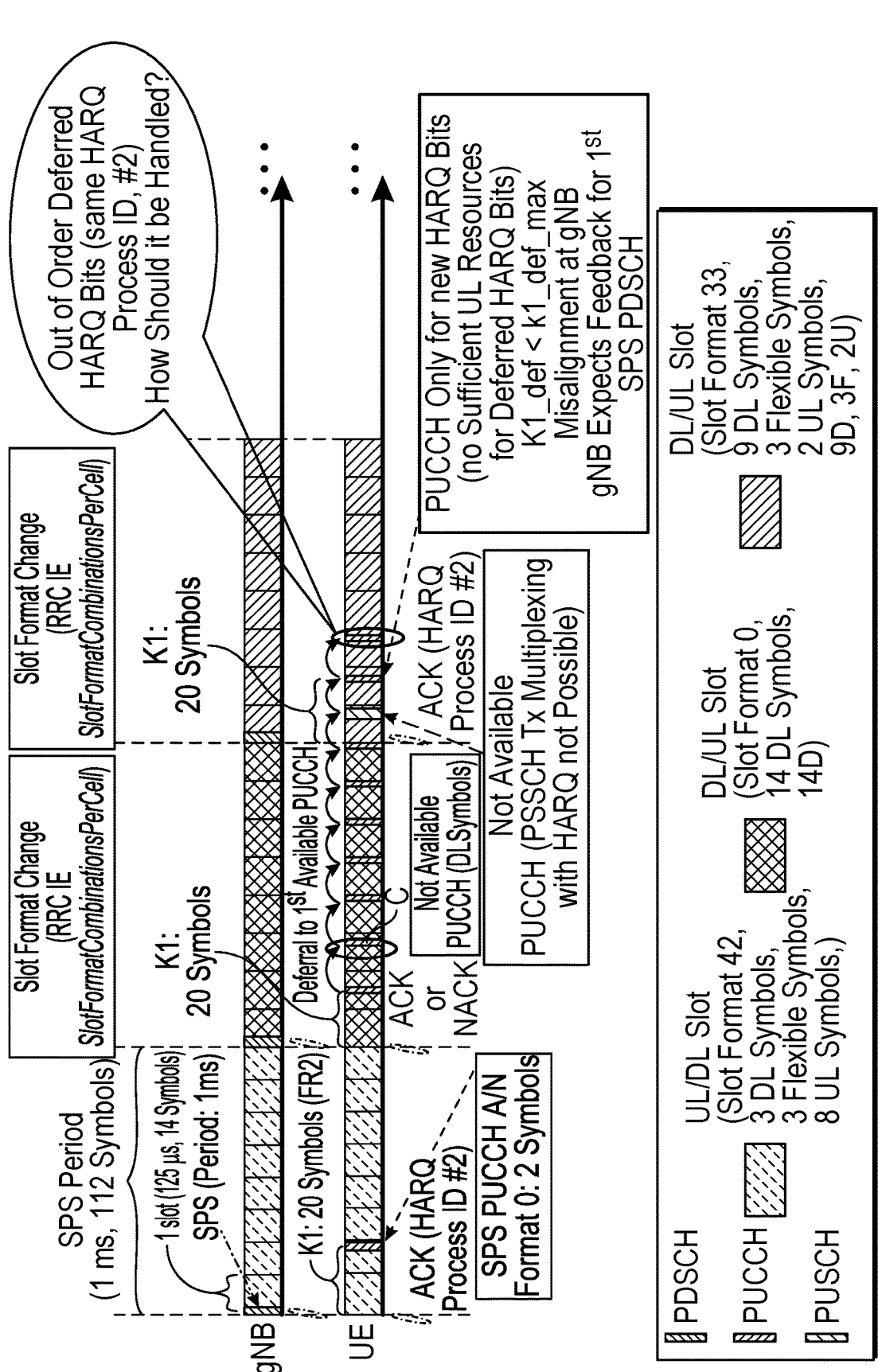
FIG. 9 illustrates an example timeline of delayed HARQ feedback, in accordance with aspects of the present disclosure.

The example in FIG. 9 may assume an ultra-reliable low latency communication (URLLC) traffic periodicity is 1 ms, SPS configuration indicates 2 DL symbols and periodicity is 1 ms, DL packet expiration is 1 ms, and K1_def_max is 2 ms.

In this example case, when a UE receives a new SPS PDSCH from a network entity, a slot for reporting a HARQ feedback for this SPS PDSCH is assumed to be k1 slots later. However, when resources for reporting a HARQ feedback for an earlier SPS PDSCH are not available until at or after the HARQ feedback is scheduled to send the HARQ feedback for the new PDSCH, there may be an issue with how or what the HARQ feedback to report. In such cases, a PUCCH may only be available for a new HARQ feedback (e.g., as there are no sufficient UL resources available for the HARQ feedback for the earlier SPS PDSCH/deferred HARQ bits) (i.e., K1_def is less than k1_def_max). In this case, when the UE sends the HARQ feedback to the network entity for the new SPS PDSCH, the network entity may not know which PDSCH is being acknowledged (e.g., if they share a same HARQ process ID).

Example Deferral Time Prior to Next HARQ Instant

Aspects of the present disclosure provide apparatuses, methods, processing systems, and computer readable mediums for managing an out of order hybrid automatic repeat request (HARQ) transmission in case of a deferred semi-persistently scheduled (SPS) physical uplink control channel (PUCCH) HARQ.

For example, to handle a collision for a same HARQ process due to a deferred SPS HARQ acknowledgement (HARQ-ACK), one or more techniques for managing the out of order HARQ transmission are implemented. Based on the one or more techniques described herein, when a user equipment (UE) receives a physical downlink shared channel (PDSCH) of a certain HARQ process identifier (ID), the deferred SPS HARQ bit(s) for this HARQ process ID are dropped. The techniques described herein provide higher reliability and lower latency communications.

FIG. 10 is a flow diagram illustrating example operations 1000 for wireless communication, in accordance with certain aspects of the present disclosure. The operations 1000 may be performed, for example, by a user equipment (UE) (e.g., such as the UE 120a of FIG. 1). The operations 1000 may be implemented as software components that are executed and run on one or more processors (e.g., the controller/processor 480 of FIG. 4). Further, the transmission and reception of signals by the UE in operations 1000 may be enabled, for example, by one or more antennas (e.g., the antennas 452 of FIG. 4). In certain aspects, the transmission and/or reception of signals by the UE may be implemented via a bus interface of one or more processors (e.g., the controller/processor 480) obtaining and/or outputting signals.

The operations 1000 begin, at block 1002, by determining that a scheduled occasion for reporting HARQ feedback for a first SPS physical downlink shared channel (PDSCH) of a first HARQ process identifier (ID) overlaps with at least one downlink (DL) or flexible symbol. For example, the UE may determine that the scheduled occasion for reporting the HARQ feedback for the first SPS PDSCH of the first HARQ process ID overlaps with the at least one DL or flexible symbol, using a processor of the UE 120a shown in FIG. 1 or FIG. 4 and/or of the apparatus shown in FIG. 13.

At 1004, the UE reports, defers, or drops the HARQ feedback for the first SPS PDSCH if resources for reporting the HARQ feedback for the first SPS PDSCH are not available until on or after a scheduled occasion for reporting a HARQ feedback for a second PDSCH of the same first HARQ process ID, in response to the determining. For example, the UE may report, defer, or drop the HARQ feedback for the first SPS PDSCH if the resources for reporting the HARQ feedback for the first SPS PDSCH are not available until on or after the scheduled occasion for reporting the HARQ feedback for the second PDSCH of the same first HARQ process ID, using a processor of the UE 120a shown in FIG. 1 or FIG. 4 and/or of the apparatus shown in FIG. 13.

In certain aspects, deferred HARQ information bits (e.g., associated with the first HARQ process ID) are stored until new HARQ information bits are available from a same HARQ process ID (e.g., the new HARQ information bits are associated with the first HARQ process ID). This means that when there is a first available PDSCH resource and there is a list of N HARQ process IDs, the deferred HARQ information bits that are replaced with the new HARQ information bits are not reported.

In certain aspects, the UE may drop the HARQ feedback for the first SPS PDSCH (e.g., if the resources for reporting the HARQ feedback for the first SPS PDSCH are not available until on or after the scheduled occasion for reporting the HARQ feedback for the second PDSCH of the same first HARQ process ID).

In certain aspects, the UE may report, defer, or drop the HARQ feedback for the first SPS PDSCH, based on the resources for reporting the HARQ feedback not being available until a threshold amount of time after the scheduled occasion for reporting the HARQ feedback for the first SPS PDSCH.

In certain aspects, the UE may report, defer, or drop the HARQ feedback for the first SPS PDSCH, based on the resources for reporting the HARQ feedback not being available until on or after an occasion for reporting a HARQ feedback for a subsequent SPS PDSCH.

In certain aspects, the UE may send a request to a network entity to not send a dynamic grant for PDSCH transmissions with a same HARQ process ID as SPS PDSCHs for which HARQ reporting is being deferred. If granted, this request could avoid the problem of the UE reporting an out of order HARQ feedback for a PDSCH with a same HARQ process ID. In other words, the UE requests for not scheduling same HARQ process IDs (as the ones used for SPS experiencing deferrals) for new dynamic grant PDSCH.

In certain aspects, the second PDSCH may be scheduled via a dynamic grant. In some cases, the UE may drop the HARQ feedback for the first SPS PDSCH. For example, the UE may stop deferring SPS PUCCH HARQ up to the moment of PUCCH HARQ transmission for new dynamic grant PDSCH (i.e., UE drops deferred SPS PUCCH HARQ bits).

In some cases, the UE may report the HARQ feedback with an indication that the HARQ feedback is for the first SPS PDSCH or the dynamic grant scheduled PDSCH. For example, the UE may add a bit indicating a HARQ corresponds to either dynamic grant PDSCH or SPS PDSCH.

In some cases, the UE may report the HARQ feedback for the first SPS PDSCH with an indication that the HARQ feedback is out of order. For example, the UE may add a bit indicating a HARQ feedback for the out of order.

In some cases, the UE may report the HARQ feedback for the first SPS PDSCH with an indication or a DL slot or subslot in which the first SPS PDSCH was received. For example, the UE may add a field with a DL (sub)-slot number of PDSCH reception.

FIG. 11 is a flow diagram illustrating example operations 1100 for wireless communication, in accordance with certain aspects of the present disclosure. For example, the operations 1100 may be performed by a network entity (e.g., such as the base station (BS) 110*a* of FIG. 1. The operations 1100 may be implemented as software components that are executed and run on one or more processors (e.g., the controller/processor 440 of FIG. 4). Further, the transmission and reception of signals by the network entity in operations 1100 may be enabled, for example, by one or more antennas (e.g., the antennas 434 of FIG. 4). In certain aspects, the transmission and/or reception of signals by the network entity may be implemented via a bus interface of one or more processors (e.g., the controller/processor 440) obtaining and/or outputting signals.

The operations 1100 begin, at 1102, by transmitting a first SPS PDSCH of a first HARQ process ID to a UE. For example, the network entity may transmit the first SPS PDSCH of the first HARQ process ID to the UE, using antenna(s) and transmitter/transceiver components of the BS 110*a* shown in FIG. 1 or FIG. 4 and/or of the apparatus shown in FIG. 14.

At 1104, the network entity transmits a second PDSCH of the same first HARQ process ID to the UE before receiving a HARQ feedback from the UE for the first SPS PDSCH. For example, the network entity may transmit the second PDSCH of the same first HARQ process ID to the UE, using antenna(s) and transmitter/transceiver components of the BS 110*a* shown in FIG. 1 or FIG. 4 and/or of the apparatus shown in FIG. 14.

At 1106, the network entity receives the HARQ feedback for the first HARQ process ID on or after a scheduled occasion for reporting the HARQ feedback for the second PDSCH. For example, the network entity may receive the HARQ feedback for the first HARQ process ID on or after the scheduled occasion for reporting the HARQ feedback for the second PDSCH, using antenna(s) and receiver/transceiver components of the BS 110*a* shown in FIG. 1 or FIG. 4 and/or of the apparatus shown in FIG. 14.

At 1108, the network entity decides whether the received HARQ feedback is for the first SPS PDSCH or the second PDSCH. For example, the network entity may decide whether the received HARQ feedback is for the first SPS PDSCH or the second PDSCH, using a processor of the BS 110*a* shown in FIG. 1 or FIG. 4 and/or of the apparatus shown in FIG. 14.

The operations shown in FIGS. 10 and 11 are further described with reference to FIG. 12.

Figure 12:
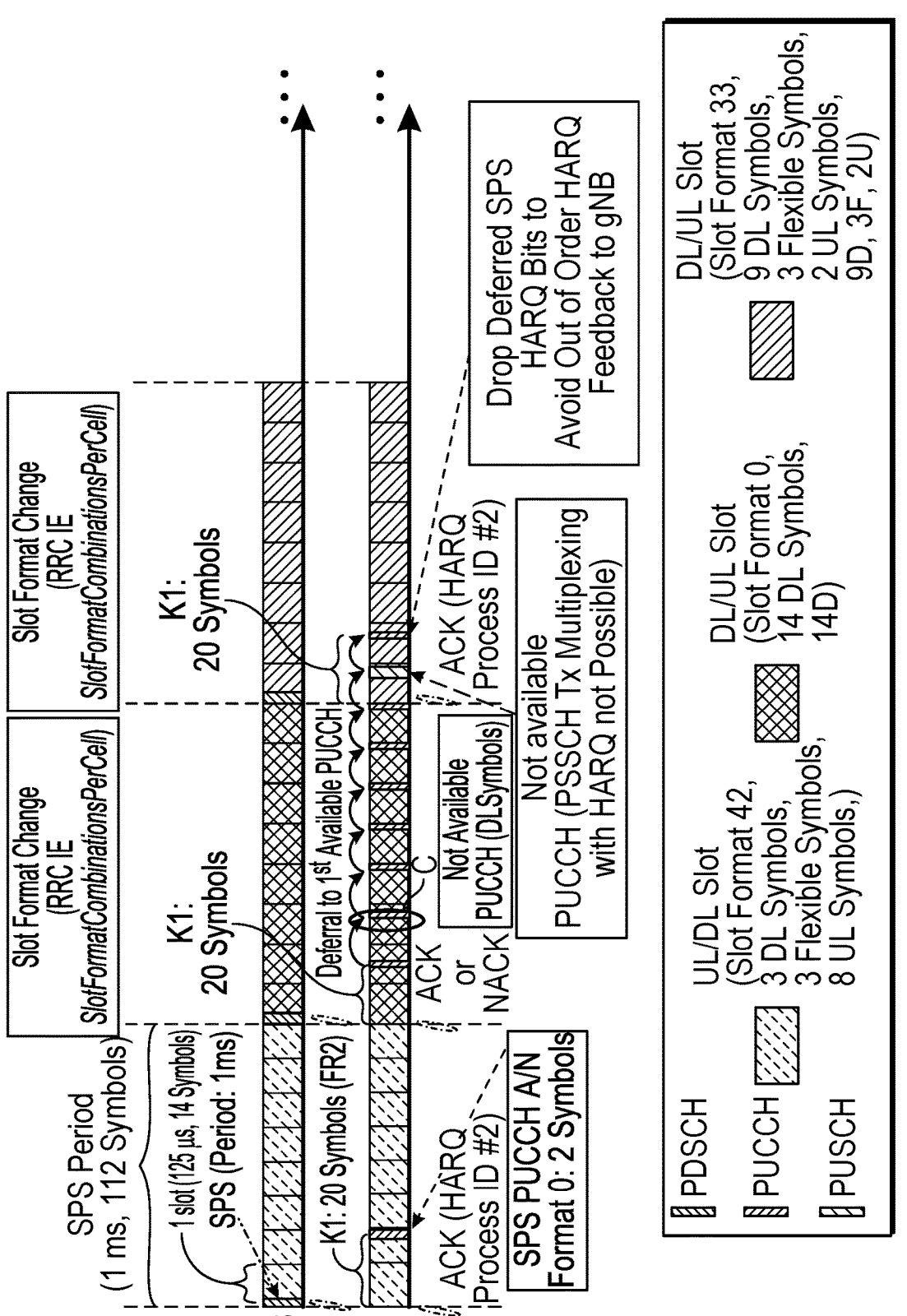
FIG. 12 illustrates an example timeline of a deferral time prior to a next HARQ instant, in accordance with aspects of the present disclosure.

As illustrated in FIG. 12, the UE may drop deferred SPS HARQ bits to avoid an out of order (OoO) HARQ feedback to the network entity (e.g., gNB).

In the illustrated example, the network entity sends a first SPS PDSCH (e.g., an earliest SPS PDSCH) of a first HARQ process ID (e.g., HARD process ID #2) to the UE. The UE determines that a scheduled occasion for reporting a HARQ feedback for the first SPS PDSCH overlaps with a DL symbol. The UE may report, defer, or drop the HARQ feedback for the first SPS PDSCH (e.g., if resources for reporting the HARQ feedback for the first SPS PDSCH are not available until on or after a scheduled occasion for reporting a HARQ feedback for a second PDSCH of the same first HARQ process ID).

In this example case, an ultra-reliable low latency communication (URLLC) traffic periodicity is 1 ms, SPS configuration indicates 2 DL symbols and periodicity is 1 ms, DL packet expiration is 1 ms, and K1_def_max is 1.2 ms (prior to a next HARQ occasion).

In the illustrated example, the UE drops the HARQ feedback for the first SPS PDSCH (i.e., deferred SPS HARQ bits) to avoid an out of order HARQ feedback to the network entity. For example, the UE does not allow the HARQ feedback for the first SPS PDSCH (i.e., deferred SPS PUCCH HARQ) to be transmitted to the network entity when resources for reporting the HARQ feedback for the first SPS PDSCH are not made available until a threshold amount of time after the scheduled occasion for reporting a HARQ feedback for the second PDSCH of the same first HARQ process ID (i.e., a next SPS PUCCH HARQ occasion when K1_def_max is less than a SPS Period+k1). In some cases, the UE stops deferring the SPS PUCCH HARQ up to a next SPS PUCCH HARQ occasion (based on a RRC configuration).

In certain aspects, the UE considers a timing of a real PUCCH HARQ transmission. In case of a SPS PUCCH HARQ deferral: a time instant of a deferred SPS PUCCH HARQ transmission.

In certain aspects, the UE requests the network entity to not schedule same HARQ process IDs (as the ones used for the SPS PDSCHs experiencing deferrals) for a new dynamic grant for PDSCH transmissions.

In certain aspects, the second PDSCH is scheduled via a dynamic grant (e.g., a DG PDSCH having a same HARQ process ID as of the first SPS PDSCH). In this case, the UE may stop deferring the HARQ feedback for the first SPS PDSCH (i.e., SPS PUCCH HARQ) up to a moment of PUCCH HARQ transmission for the second PDSCH (i.e., the UE drops deferred SPS PUCCH HARQ bits). In some cases, the UE may report the HARQ feedback and add a bit indicating that the HARQ feedback corresponds to the second SPS PDSCH (e.g., a DG PDSCH) or the first SPS PDSCH (e.g., a SPS PDSCH). In some cases, the UE may add a bit indicating that the HARQ feedback (for the first SPS PDSCH) is an out of order HARQ transmission. In some cases, the UE may add a field with a DL sub slot number of a PDSCH reception.

Example Communication Devices

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 is configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., a computer-executable code) that when executed by the processor 1304, cause the processor 1304 to perform the operations illustrated in FIG. 10, or other operations for performing the various techniques discussed herein. In certain aspects, computer-readable medium/memory 1312 stores code 1314 for determining and code 1316 for reporting, deferring, or dropping. The code 1314 for determining may include code for determining that a scheduled occasion for reporting hybrid automatic repeat request (HARQ) feedback for a first semi-persistently scheduled (SPS) physical downlink shared channel (PDSCH) of a first HARQ process identifier (ID) overlaps with at least one downlink or flexible symbol. The code 1316 for reporting, deferring, or dropping may include code for reporting, deferring, or dropping the HARQ feedback for the first SPS PDSCH if resources for reporting the HARQ feedback for the first SPS PDSCH are not available until on or after a scheduled occasion for reporting a HARQ feedback for a second PDSCH of the same first HARQ process ID, in response to the determining.

The processor 1304 may include circuitry configured to implement the code stored in the computer-readable medium/memory 1312, such as for performing the operations illustrated in FIG. 10, as well as other operations for performing the various techniques discussed herein. For example, the processor 1304 includes circuitry 1318 for determining and circuitry 1320 for reporting, deferring, or dropping. The circuitry 1318 for determining may include circuitry for determining that a scheduled occasion for reporting HARQ feedback for a first SPS PDSCH of a first HARQ process ID overlaps with at least one downlink or flexible symbol. The circuitry 1320 for reporting, deferring, or dropping may include circuitry for reporting, deferring, or dropping may include code for reporting, deferring, or dropping the HARQ feedback for the first SPS PDSCH if resources for reporting the HARQ feedback for the first SPS PDSCH are not available until on or after a scheduled occasion for reporting a HARQ feedback for a second PDSCH of the same first HARQ process ID, in response to the determining.

FIG. 14 illustrates a communications device 1400 that may include various components (e.g., corresponding to means-plus-function components) configured to perform operations for the techniques disclosed herein, such as the operations illustrated in FIG. 11. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 is configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., a computer-executable code) that when executed by the processor 1404, cause the processor 1404 to perform the operations illustrated in FIG. 11, or other operations for performing the various techniques discussed herein. In certain aspects, computer-readable medium/memory 1412 stores code 1414 for transmitting, code 1416 for transmitting, code 1418 for receiving, and code 1420 for deciding. The code 1414 for transmitting may include code for transmitting a first SPS PDSCH of a first HARQ process ID to a user equipment (UE). The code 1416 for transmitting may include code for transmitting a second PDSCH of the same first HARQ process ID to the UE before receiving a HARQ feedback from the UE for the first SPS PDSCH. The code 1418 for receiving may include code for receiving the HARQ feedback for the first HARQ process ID on or after a scheduled occasion for reporting the HARQ feedback for the second PDSCH. The code 1420 for deciding may include code for deciding whether the received HARQ feedback is for the first SPS PDSCH or the second PDSCH.

The processor 1404 may include circuitry configured to implement the code stored in the computer-readable medium/memory 1412, such as for performing the operations illustrated in FIG. 11, as well as other operations for performing the various techniques discussed herein. For example, the processor 1404 includes circuitry 1422 for transmitting, circuitry 1424 for transmitting, circuitry 1426 for receiving, and circuitry 1428 for deciding. The circuitry 1422 for transmitting may include circuitry for transmitting a first SPS PDSCH) of a first HARQ) process ID) to a UE. The circuitry 1424 for transmitting may include circuitry for transmitting a second PDSCH of the same first HARQ process ID to the UE before receiving a HARQ feedback from the UE for the first SPS PDSCH. The circuitry 1426 for receiving may include circuitry for receiving the HARQ feedback for the first HARQ process ID on or after a scheduled occasion for reporting the HARQ feedback for the second PDSCH. The circuitry 1428 for deciding may include circuitry for deciding whether the received HARQ feedback is for the first SPS PDSCH or the second PDSCH.

Example Disaggregated BS

FIG. 15 depicts an example disaggregated base station (BS) 1500 architecture. The disaggregated BS 1500 architecture may include one or more central units (CUs) 1510 that can communicate directly with a core network 1520 via a backhaul link, or indirectly with the core network 1520 through one or more disaggregated BS units (such as a Near-Real Time (Near-RT) RAN Intelligent Controller (RIC) 1525 via an E2 link, or a Non-Real Time (Non-RT) RIC 1515 associated with a Service Management and Orchestration (SMO) Framework 1505, or both). A CU 1510 may communicate with one or more distributed units (DUs) 1530 via respective midhaul links, such as an F1 interface. The DUs 1530 may communicate with one or more radio units (RUs) 1540 via respective fronthaul links. The RUs 1540 may communicate with respective UEs 120 via one or more radio frequency (RF) access links. In some implementations, the UE 120 may be simultaneously served by multiple RUs 1540.

Each of the units, i.e., the CUs 1510, the DUs 1530, the RUs 1540, as well as the Near-RT RICs 1525, the Non-RT RICs 1515 and the SMO Framework 1505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1510. The CU 1510 may be configured to handle user plane functionality (i.e., Central Unit-User Plane (CU-UP)), control plane functionality (i.e., Central Unit-Control Plane (CU-CP)), or a combination thereof. In some implementations, the CU 1510 can be logically split into one or more CU-UP units and one or more CU-CP units. The CU-UP unit can communicate bidirectionally with the CU-CP unit via an interface, such as the E1 interface when implemented in an O-RAN configuration. The CU 1510 can be implemented to communicate with the DU 1530, as necessary, for network control and signaling.

The DU 1530 may correspond to a logical unit that includes one or more base station functions to control the operation of one or more RUs 1540. In some aspects, the DU 1530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 1530 may further host one or more low PHY layers. Each layer (or module) can be implemented with an interface configured to communicate signals with other layers (and modules) hosted by the DU 1530, or with the control functions hosted by the CU 1510.

Lower-layer functionality can be implemented by one or more RUs 1540. In some deployments, an RU 1540, controlled by a DU 1530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1540 can be implemented to handle over the air (OTA) communication with one or more UEs 120. In some implementations, real-time and non-real-time aspects of control and user plane communication with the RU(s) 1540 can be controlled by the corresponding DU 1530. In some scenarios, this configuration can enable the DU(s) 1530 and the CU 1510 to be implemented in a cloud-based RAN architecture, such as a vRAN architecture.

The SMO Framework 1505 may be configured to support RAN deployment and provisioning of non-virtualized and virtualized network elements. For non-virtualized network elements, the SMO Framework 1505 may be configured to support the deployment of dedicated physical resources for RAN coverage requirements which may be managed via an operations and maintenance interface (such as an O1 interface). For virtualized network elements, the SMO Framework 1505 may be configured to interact with a cloud computing platform (such as an open cloud (O-Cloud) 1590) to perform network element life cycle management (such as to instantiate virtualized network elements) via a cloud computing platform interface (such as an O2 interface). Such virtualized network elements can include, but are not limited to, CUs 1510, DUs 1530, RUs 1540 and Near-RT RICs 1525. In some implementations, the SMO Framework 1505 can communicate with a hardware aspect of a 4G RAN, such as an open eNB (O-eNB) 1511, via an O1 interface. Additionally, in some implementations, the SMO Framework 1505 can communicate directly with one or more RUs 1540 via an O1 interface. The SMO Framework 1505 also may include a Non-RT RIC 1515 configured to support functionality of the SMO Framework 1505.

The Non-RT RIC 1515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC X25. The Non-RT RIC 1515 may be coupled to or communicate with (such as via an A1 interface) the Near-RT RIC 1525. The Near-RT RIC 1525 may be configured to include a logical function that enables near-real-time control and optimization of RAN elements and resources via data collection and actions over an interface (such as via an E2 interface) connecting one or more CUs 1510, one or more DUs 1530, or both, as well as an O-eNB, with the Near-RT MC 1525.

In some implementations, to generate AI/ML models to be deployed in the Near-RT RIC 1525, the Non-RT MC 1515 may receive parameters or external enrichment information from external servers. Such information may be utilized by the Near-RT RIC 1525 and may be received at the SMO Framework 1505 or the Non-RT RIC 1515 from non-network data sources or from network functions. In some examples, the Non-RT RIC 1515 or the Near-RT MC 1525 may be configured to tune RAN behavior or performance. For example, the Non-RT MC 1515 may monitor long-term trends and patterns for performance and employ AI/ML models to perform corrective actions through the SMO Framework 1505 (such as reconfiguration via O1) or via creation of RAN management policies (such as AI policies).

Example Aspects

Implementation examples are described in the following numbered aspects.

In a first aspect, a method for wireless communications by a user equipment (UE), comprising: determining that a scheduled occasion for reporting hybrid automatic repeat request (HARQ) feedback for a first semi-persistently scheduled (SPS) physical downlink shared channel (PDSCH) of a first HARQ process identifier (ID) overlaps with at least one downlink or flexible symbol; and reporting, deferring, or dropping the HARQ feedback for the first SPS PDSCH if resources for reporting the HARQ feedback for the first SPS PDSCH are not available until on or after a scheduled occasion for reporting a HARQ feedback for a second PDSCH of the same first HARQ process ID, in response to the determining.

In a second aspect, alone or in combination with the first aspect, the reporting, deferring, or dropping is based on the resources for reporting the HARQ feedback not being available until a threshold amount of time after the scheduled occasion for reporting the HARQ feedback for the first SPS PDSCH.

In a third aspect, alone or in combination with the first aspect, the reporting, deferring, or dropping is based on the resources for reporting the HARQ feedback not being available until on or after an occasion for reporting a HARQ feedback for a subsequent SPS PDSCH.

In a fourth aspect, alone or in combination with the first aspect, sending a request, to a network entity, to not send a dynamic grant for PDSCH transmissions with a same HARQ process ID as SPS PDSCHs for which HARQ reporting is being deferred.

In a fifth aspect, alone or in combination with the first aspect, the second PDSCH is scheduled via a dynamic grant.

In a sixth aspect, alone or in combination with the fifth aspect, dropping the HARQ feedback for the first SPS PDSCH.

In a seventh aspect, alone or in combination with the fifth aspect, reporting the HARQ feedback comprises reporting the HARQ feedback with an indication that the HARQ feedback is for the first SPS PDSCH or the dynamic grant scheduled PDSCH.

In an eighth aspect, alone or in combination with the fifth aspect, reporting the HARQ feedback comprises reporting the HARQ feedback for the first SPS PDSCH with an indication that the HARQ feedback is out of order.

In a ninth aspect, alone or in combination with the fifth aspect, reporting the HARQ feedback comprises reporting the HARQ feedback for the first SPS PDSCH with an indication in a downlink slot or a subslot in which the first SPS PDSCH was received.

In a tenth aspect, a method for wireless communications by a network entity, comprising: transmitting a first semi-persistently scheduled (SPS) physical downlink shared channel (PDSCH) of a first hybrid automatic repeat request (HARQ) process identifier (ID) to a user equipment (UE); transmitting a second PDSCH of the same first HARQ process ID to the UE before receiving a HARQ feedback from the UE for the first SPS PDSCH; receiving the HARQ feedback for the first HARQ process ID on or after a scheduled occasion for reporting the HARQ feedback for the second PDSCH; and deciding whether the received HARQ feedback is for the first SPS PDSCH or the second PDSCH.

In an eleventh aspect, alone or in combination with the tenth aspect, receiving an indication from the UE indicating the received HARQ feedback is for the first SPS PDSCH or the second PDSCH.

In a twelfth aspect, alone or in combination with the eleventh aspect, the indication comprises a bit.

In a thirteenth aspect, alone or in combination with the twelfth aspect, the decision is based on the bit indicating the received HARQ feedback is for the first SPS PDSCH or the second PDSCH.

In a fourteenth aspect, alone or in combination with the tenth aspect, receiving a request, from the UE, to not send a dynamic grant for PDSCH transmissions with a same HARQ process ID as SPS PDSCHs for which HARQ reporting is being deferred.

In a fifteenth aspect, alone or in combination with the tenth aspect, the second PDSCH is scheduled via a dynamic grant.

An apparatus for wireless communication, comprising at least one processor; and a memory coupled to the at least one processor, the memory comprising code executable by the at least one processor to cause the apparatus to perform the method of any of the first through fifteenth aspects.

An apparatus comprising means for performing the method of any of the first through fifteenth aspects.

A computer readable medium storing computer executable code thereon for wireless communications that, when executed by at least one processor, cause an apparatus to perform the method of any of the first through fifteenth aspects.

Additional Considerations

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, processors 458, 464, 466, and/or controller/processor 480 of the UE 120a and/or processors 420, 430, 438, and/or controller/processor 440 of the BS 110a shown in FIG. 4 may be configured to perform operations 1000 of FIG. 10 and operations 1100 of FIG. 11.

Means for receiving may include a receiver such as one or more antennas and/or receive processors illustrated in FIG. 4. Likewise, means for transmitting may include a transmitter such as one or more antennas and/or transmit processors illustrated in FIG. 4. Means for monitory, means for indicating, means for signaling, means for activating, and means for deactivating may include a processing system, which may include one or more processors, such as processors 458, 464, 466, and/or controller/processor 480 of the UE 120a and/or processors 420, 430, 438, and/or controller/processor 440 of the BS 110a shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a graphics processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

The invention claimed is:

1. A method for wireless communications at a user equipment (UE), comprising:

determining a scheduled occasion for reporting a hybrid automatic repeat request (HARQ) feedback for a first semi-persistently scheduled (SPS) physical downlink shared channel (PDSCH) of a first HARQ process identifier (ID) overlaps with at least one downlink or flexible symbol;

deferring the HARQ feedback for the first SPS PDSCH based on the determining; and dropping the HARQ feedback for the first SPS PDSCH when resources for reporting the HARQ feedback for the first SPS PDSCH are not available until on or after a scheduled occasion for reporting a HARQ feedback for a second PDSCH of the same first HARQ process ID.

2. The method of claim 1, wherein the dropping is based on the resources for reporting the HARQ feedback for the first SPS PDSCH not being available until a threshold amount of time after the scheduled occasion for reporting the HARQ feedback for the first SPS PDSCH.

3. The method of claim 1, wherein the dropping is based on the resources for reporting the HARQ feedback for the first SPS PDSCH not being available until on or after an occasion for reporting a HARQ feedback for a subsequent SPS PDSCH.

4. The method of claim 1, further comprising sending a request, to a network entity, to not send a dynamic grant for PDSCH transmissions with a same HARQ process ID as the first SPS PDSCH.

5. The method of claim 1, wherein the second PDSCH is scheduled via a dynamic grant.

6. A method for wireless communications at a network entity, comprising:

transmitting a first semi-persistently scheduled (SPS) physical downlink shared channel (PDSCH) of a first hybrid automatic repeat request (HARQ) process identifier (ID) to a user equipment (UE);

transmitting a second PDSCH of the first HARQ process ID to the UE before receipt of HARQ feedback from the UE for the first SPS PDSCH;

receiving a HARQ feedback and a bit on or after a scheduled occasion for reporting HARQ feedback for the second PDSCH, wherein the bit indicates the received HARQ feedback is for the first SPS PDSCH or the second PDSCH; and deciding, based on the bit, whether the received HARQ feedback is for the first SPS PDSCH or the second PDSCH.

7. The method of claim 6, further comprising receiving an indication from the UE indicating the received HARQ feedback is for the first SPS PDSCH or the second PDSCH.

8. The method of claim 6, further comprising receiving a request, from the UE, to not send a dynamic grant for PDSCH transmissions with a same HARQ process ID as the first SPS PDSCH.

9. The method of claim 6, wherein the second PDSCH is scheduled via a dynamic grant.

10. An apparatus for wireless communications at a user equipment (UE), comprising:

a memory comprising instructions; and one or more processors, individually or collectively, configured to execute the instructions and cause the apparatus to:

determine a scheduled occasion for reporting a hybrid automatic repeat request (HARQ) feedback for a first semi-persistently scheduled (SPS) physical downlink shared channel (PDSCH) of a first HARQ process identifier (ID) overlaps with at least one downlink or flexible symbol;

defer the HARQ feedback for the first SPS PDSCH based on the determination; and drop the HARQ feedback for the first SPS PDSCH when resources for reporting the HARQ feedback for the first SPS PDSCH are not available until on or after a scheduled occasion for reporting a HARQ feedback for a second PDSCH of the same first HARQ process ID.

11. The apparatus of claim 10, wherein the one or more processors, individually or collectively, are configured to execute the instructions and cause the apparatus to drop the HARQ feedback for the first SPS PDSCH based on the resources for reporting the HARQ feedback for the first SPS PDSCH not being available until a threshold amount of time after the scheduled occasion for reporting the HARQ feedback for the first SPS PDSCH.

12. The apparatus of claim 10, wherein the one or more processors, individually or collectively, are configured to execute the instructions and cause the apparatus to drop the HARQ feedback for the first SPS PDSCH based on the resources for reporting the HARQ feedback for the first SPS PDSCH not being available until on or after an occasion for reporting a HARQ feedback for a subsequent SPS PDSCH.

13. The apparatus of claim 10, wherein the one or more processors, individually or collectively, are configured to execute the instructions and cause the apparatus to send a request, to a network entity, to not send a dynamic grant for PDSCH transmissions with a same HARQ process ID as the first SPS PDSCH.

14. The apparatus of claim 10, wherein the second PDSCH is scheduled via a dynamic grant.

15. An apparatus for wireless communications at a network entity, comprising:

a memory comprising instructions; and one or more processors, individually or collectively, configured to execute the instructions and cause the apparatus to:

transmit a first semi-persistently scheduled (SPS) physical downlink shared channel (PDSCH) of a first hybrid automatic repeat request (HARQ) process identifier (ID) to a user equipment (UE);

transmit a second PDSCH of the first HARQ process ID to the UE before receipt of HARQ feedback from the UE for the first SPS PDSCH;

receive a HARQ feedback and a bit on or after a scheduled occasion for reporting HARQ feedback for the second PDSCH, wherein the bit indicates the received HARQ feedback is for the first SPS PDSCH or the second PDSCH; and decide, based on the bit, whether the received HARQ
feedback is for the first SPS PDSCH or the second
PDSCH.

16. The apparatus of claim 15, wherein the one or more
processors, individually or collectively, are configured to
execute the instructions and cause the apparatus to receive
an indication from the UE indicating the received HARQ
feedback is for the first SPS PDSCH or the second PDSCH.

17. The apparatus of claim 15, wherein the one or more
processors, individually or collectively, are configured to
execute the instructions and cause the apparatus to receive a
request, from the UE, to not send a dynamic grant for
PDSCH transmissions with a same HARQ process ID as of
the first SPS PDSCH.

18. The apparatus of claim 15, wherein the second
PDSCH is scheduled via a dynamic grant.

\* \* \* \* \*